United States Patent Office 3,834,898
Patented Sept. 10, 1974

3,834,898
VALVE SEAT MATERIAL FOR INTERNAL COMBUSTION ENGINES AND SIMILAR MATERIAL
Kenya Motoyoshi, Itami, and Makoto Osawa, Tokyo, Japan, assignors to Sumitomo Electric Industries, Ltd., Osaka, and Honda Giken Kogyo Kabushiki Kaisha, Tokyo, Japan
Filed Sept. 3, 1971, Ser. No. 177,719
Claims priority, application Japan, Sept. 3, 1970, 45/77,402; Nov. 11, 1970, 45/98,655
Int. Cl. C22c 37/14, 39/20
U.S. Cl. 75—126 R          1 Claim

ABSTRACT OF THE DISCLOSURE

A valve seat material for an internal combustion engine, which comprises an iron base alloy matrix having dispersed therein a member selected from the group consisting of Pb and a Pb compound and glass.

BACKGROUND OF THE INVENTION

Description of the Prior Art

The cylinder of the internal combustion engine, such as the gasoline engine is provided with an inlet to suck a fuel therein and an outlet to exhaust a combustion gas therefrom. Each suck inlet and exhaust outlet is shut with a valve, which is pressed up by a spring, and in the case of suck or exhaust, the inlet or outlet may be opened by striking the valve with a cam through a tappet and pressing down the valve.

Generally, the valve seat material for such valve receiving a low load has been composed of a low alloy cast iron, such as a Cu-Cr-Mo-C-Fe alloy and a Ni-Cr-Mo-C-Fe alloy, and on the other hand, the valve seat material for such valve receiving a high load has been composed of a high alloy system cast iron or cast steel having a high Cr content.

The valve seat is exposed to a high temperature by the effect of the combustion of fuel and also receives impacts by the valve and a sliding friction by the rotation of the valve.

In engines using a lead-added gasoline (containing an antiknock agent), it has been considered that the lead contained in the gasoline gives rise to the combustion products, such as PbO, $PbSO_4$ and others by the reaction with S, P and others contained in the engine oil and gasoline and as the result, the contact surface between the valve and the valve seat is covered with a thin layer of combustion products, as a lubricant layer to reduce the friction between the valve and the valve seal.

On the contrary, in engines using a leadless gasoline (not containing a lead compound as an antiknock agent) or propane gas, the thin layer of combustion products as a lubricant agent (mentioned above) is not formed on the contact surface between the valve and valve seat. Consequently, the valve and valve seat are directly contacted and undesirably rubbed with each other at the contact surface to cause the generation of frictional heat and the elevation of the temperature thereof. As a result thereof, each surface of valve and valve seat is undesirably worn away. Accordingly, the engines are undesirably reduced in power since the fixed tappet clearance is varied and thus the suck and exhaust can not be performed at a desired rate.

To prevent such a defect from occurring we have tried to use a well known heat resistant and wear resistant alloy, such as Monel metal, high alloy die steel and super heat resistant steel for the valve and valve seat but we have not thus obtained desired results.

SUMMARY OF THE INVENTION

Therefore, an object of this invention is to provide a valve seat material having excellent wear resistance for internal combustion engines and the similar material.

It is a further object of this invention to provide a valve seat material having good properties of wear resistance, heat resistance and self-lubricity, even in the presence of a leadless gasoline.

These objects can be attained by a valve seat material containing Pb or a Pb compound and glass in which the Pb or Pb compound and glass are dispersed in a matrix of an iron base alloy.

BRIEF DESCRIPTION OF THE DRAWING

FIG. 1 is a graphical showing of the variation of the friction resistant property of glass used in this invention.

FIG. 2 is a graphical showing of the variation of the wear resistant property of a valve seat according to this invention.

DETAILED DESCRIPTION OF THE INVENTION

This invention relates to a valve seat material for internal combustion engines, and more particularly to a valve seat material for internal combustion engines containing Pb or a Pb compound and a low melting point silicate glass in which the Pb or Pb compound and low melting point silicate glass are dispersed in the whole or part of the matrix of an iron base alloy, such as a Fe-Cr-C alloy and a Fe-Cr-Cu-C alloy.

An object of this invention is to provide a valve seat material suitable for internal combustion engines using the usual leadless gasoline as the fuel source.

This invention will be more fully understood by reference to the following description.

It is a reason for adding Pb or a Pb compound to the iron base alloy that the Pb or Pb compound contained in the iron base alloy matrix educes on the surface of the valve seat at a temperature over about 250° C. and acts as a lubricant. The quantity of Pb or Pb compound to be added to the iron base alloy may be varied in the range between about 0.3 wt. percent and 10 wt. percent in accordance with the kind of engines employed. In the case of Pb or a Pb compound content up to about 0.3 wt. percent, the effective lubricant property of the valve seat can not be obtained, and in the case of Pb or a Pb compound content over about 10 wt. percent, the effective strength of the valve seat can not be obtained.

Usually, the suck valve of the motor car is exposed to a temperature of about 300 to 600° C. and the valve seat thereof is exposed to a temperature of about 200 to 300° C.

As hard oxide and carbide particles are contained still in the air passed through the air-cleaner, the valve seat of the engine is undesirably worn away by the effect of the particles, even if the surface of the valve seat is covered with the combustion products layer, such as PbO, $PbSO_4$, $CaSO_4$ and others formed by using the lead-added gasoline as the fuel source for the engine. Such wear of the surface of the valve seat may be prevented by containing copper in the valve seat, wherein Cu compounds, such as CuO, $CuSO_4$ and others arising from the copper at a temperature from about 400 to 450° C. reduce effectively the wear of the surface of the valve seat in cooperation with Pb compounds, such as PbO, PbSO and others as mentioned above. The Cu content in the valve seat may be in the range from about 5 to 45 wt. percent, wherein in the case of not exceeding 5 wt. percent Cu content, the valve seat can not exhibit good properties of lubricity and heat conductivity thereof because Cu solutes completely in Fe as the base metal and on the contrary, in the case of exceeding 45 wt. percent Cu content, the valve seat can not exhibit good properties of mechanical strength thereof.

Various kinds of glass may be applied for the glass to be contained in the valve seat. For example, low melting point silicate glass, such as sodium lime glass and borosilicate glass is suitable. The $SiO_2$ contained in the glass may prevent the oxidation of PbO transforming to $Pb_3O_4$ and also, the glass may improve effectively the wear resistance property of the valve seat in cooperation with Pb oxides and Cu oxides by softening at a temperature over about 400° C. The glass may be contained in the valve seat up to about 10 wt. percent. In the case of exceeding 10 wt. percent glass content, the cutability of valve seat material is reduced.

In addition to Pb, Pb compounds, Cu, Cu compounds and low melting point silicate glass as mentioned above, Cr, C and other compounds may be contained in the valve seat material to improve the mechanical properties and workability thereof.

The valve seat material according to this invention may be produced by a well known powder metallurgic process or by infiltrating Pb, Pb compounds, Cu compounds and glass in the surface of valve seat mother material produced by a well known powder metallurgical process. Moreover, the valve seat material may be subjected to a forging work to improve the mechanical strength thereof. The forging work of the valve seat is performed easily by the effect of glass.

The valve seats produced with the valve seat materials according to the invention and the well known valve seat materials were subjected to the wear tests with two test conditions of (A) and (B). The results of the tests were shown in Tables 1 to 5.

(A) TEST CONDITIONS

Applied internal combustion engine. — 2 cylinders 360 cc. OHC engine.
Condition — 7500 r.p.m. 4/4 (full throttle).
Applied gasoline — Octane value 90 leadless gasoline (0.002 g./gallon).

TABLE 2.—THE WEAR RATIO OF THE VALVE SEAT

| Valve seat material | Time of wear away, hr. | Reduction of tappet clearance [1] | |
|---|---|---|---|
| Fe-Cu-Cr-Mo (as cast) | 2 | 0.15 | NG |
| Fe-2.0C-12Cr | 10 | 0.15 | NG |
| Fe-1.0C-8Cr-0.2Pb | 19 | 0.15 | NG |
| Fe-1.0C-5Cr-2.0Pb | 68 | 0.15 | NG |
| Fe-1.0C-5Cr-4.Pb | 70 | 0.15 | NG |
| Fe-1.0C-5Cr-2.0Pb-1.0G | 300 | 0.01 | OK |
| Fe-1.0C-5Cr-2.0Pb-2.0G | 300 | 0.01 | OK |
| Monel S | 33 | 0.15 | NG |

[1] The decision method: In the case in which the tappet clearance set to 0.15 mm. was reduced to 0 and the operation of engine was stopped, the valve seat material was decided as NG. The wear test was not performed over 300 hr.

TABLE 3.—COMBUSTION PRODUCTS ADHERED ON THE SURFACE OF THE VALVE SEAT

| | Valve seat material | | | |
|---|---|---|---|---|
| | SKD 1 | | Fe-1.0C-5Cr-2Pb | Fe-1.0C-5Cr-2Pb-1G |
| Fuel | Lead-added gasoline | Leadless gasoline | Leadless gasoline | |
| Products | PbO, $Pb_3O_4$ $PbSO_4$ | $CaSO_4$ $(NH_4)_2SO_4$ | $CaSO_4$ $PbSO_4$, PbO | $CaSO_4$ $PbSO_4$, PbO $SiO_2$ $PbO-SiO_2$ $SiO_2-ZnO$ |
| | | $Pb_5(PO_4)_3OH$ | | |

(B) TEST CONDITIONS

Applied internal combustion engine. — 4 cylinder, 1300 cc., OHC engine.
Operation condition — 7,000 r.p.m. 4/4 (full throttle).
Applied gasoline — Octane valve 90 leadless gasoline (0.002 g./gallon).

TABLE 4.—WEAR RATIOS OF VALVE SEATS

| | | Suck valve seat | | Exhaust valve seat | |
|---|---|---|---|---|---|
| | Valve seat material (wt. percent) | Time of wear away | Reduction value [1] | Time of wear away | Reduction value |
| (A) | 1Cu-0.5Cr-0.3Mo-Fe cast iron | 2 | 0.1 NG | 1 | 0.1 NG |
| (B) | 2C-12Cr-Fe alloy | 12 | 0.1 NG | 10 | 0.1 |
| (C) | 1C-5Cr-2Pb-2G-Fe sintered alloy | 38 | 0.1 | 21 | 0.1 |
| (D) | 1C-5Cr-2Pb-20Cu-Fe sintered alloy | X130 | 0.02 | X120 | 0.05 |
| (E) | 1C-5Cr-20Cu-2G-Fe sintered alloy | X130 | 0.04 | X130 | 0.05 |
| (F) | 1C-5Cr-2Pb-2G-20Cu-Fe sintered alloy | X170 | 0.02 | X170 | 0.01 |
| (G) | 1C-5Cr-2Pb-2G-20Cu-2MoS sintered alloy | X170 | 0.01 | X170 | 0.01 |

[1] The reduction value (mm.) shows the reduction of the tappet clearance set first to 0.1 mm.

TABLE 1.—TEMPERATURE OF EACH OF VALVE AND VALVE SEAT

| | Valve seat material | | | |
|---|---|---|---|---|
| | SKD 1 | | | Fe-1.0C-5Cr-2Pb-1G |
| Fuel | Lead-added gasoline | Leadless gasoline | Propane | Leadless gasoline |
| Maximum temperature of EX side valve, °C | 700 | 730 | 720 | 730 |
| Temperature of valve, °C | 600 | 700 | 680 | 620 |
| Temperature of valve seat, °C | 350 | 500 | 450 | 380 |

NOTE.—Operation time: 10 hrs.

In these Tables, G shows sodium line glass and X means that the reduction value was measured at the mentioned time.

Some valve seats and valves in accordance with Table 4 were made to operate for 4 hours and then the temperatures of each of the valve seats and valves were measured. The results of the measurements were as shown in Table 5.

TABLE 5.—TEMPERATURE OF EACH OF VALVE AND VALVE SEAT (±10° C.

| | Suck inlet | | | Exhaust outlet | | |
|---|---|---|---|---|---|---|
| | Maximum temperature of valve | Valve | Valve seat | Maximum temperature of valve | Valve | Valve seat |
| Valve seat material: | | | | | | |
| (B) | 590 | 500 | 310 | 850 | 820 | 610 |
| (C) | 590 | 490 | 280 | 850 | 795 | 600 |
| (D) | 590 | 395 | 200 | 840 | 710 | 470 |
| (F) | 580 | 390 | 200 | 840 | 700 | 470 |
| (G) | 500 | 380 | 190 | 840 | 700 | 460 |

From the results of wear tests (A) and (B), it will be clearly established that the valve seats made from Pb, glass and/or Cu have a superior wear resistant property as compared with that of conventional valve seats not containing these metals, wherein the valve seats having a Cu content over 5 wt. percent have a good heat conductive property to effectively radiate heat. Moreover, in the case of casting an Al head so as to lap a seat ring containing Cu, the seat ring is effectively bound with the cast Al head because Al contained in the head and Cu contained in the seat ring are alloyed to the eutectic alloy at the surface between the seat ring and the head. Also, in an Al head when placing a seat ring containing Cu thereon with a high pressure, the seat ring is effectively bound with the Al head through the operation of the engine because the Cu contained in the seat ring and Al contained in the head are alloyed at the contact surface between the seat ring and the head by the heat of over 584° C., which is the eutectic point of Cu-Al alloy, generating through the operation of the engine.

The valve seat materials according to Table 3 were produced with the following process.

The −250 mesh Pb particles and/or −150 mesh G particles (solder glass) were mixed with iron base alloy particles so as to become the composition of Fe—1.0%, C—5%, Cr—2%, Pb or Fe—1.0%, C—5%, Cr—2%, Pb—1% G, and the mixture was compressed to a green compact with the pressure of 6.9 g./cc. Subsequently, the green compact was sintered at 1250° C. for about 30 minutes in a reducing atmosphere. Similarly, the sintered alloys according to Table 4 were produced by the same powder metallurgic process.

The sintered valve seat materials were dispersed uniformly Pb and/or glass therein.

Accordingly, the valve seat formed with such sintered valve seat material may have an excellent lubricant property because Pb and glass contained in the valve seat exude on the sliding surface thereof during the operation of the internal combustion engine by the effects of combustion gas, oil, heat and striking-operation of valve and as the result, act as the lubricant.

Besides, it will be understood from the description as mentioned above that the good lubricant and wear resistant properties of the valve seat are brought about by the presence of Pb and glass contained in the valve seat, Cu contained therein assists the operations of Pb and glass, and Pb and glass are not always required to be dispersed in the whole of the valve seat. For example, Pb and glass may be only contained in the surface part of the valve seat, wherein such valve seat may be produced by preparing green compact layers containing Pb and glass particles on both surfaces of a valve seat green compact and sintering it or infiltrating Pb and glass in a sintered body not containing Pb and glass therein.

The valve seat material with a desired composition and desired shape according to this invention may be produced easily and economically by the well known powder metallurgical process as mentioned above, and the valve seat material may be subjected to forging to increase the mechanical strength thereof. Moreover, the valve seat may be produced by other processes, such as the casting process. If necessary, the valve seat may be subjected to a well known surface treatment, such as the carburizing treatment.

The present invention is not intended to be limited to the disclosure herein, and changes and modifications may be made in the disclosure by those skilled in the art without departing from the spirit and scope of the novel concepts of this invention. Such modifications and variations are considered to be within the purview and scope of this invention and the appended claim.

What is claimed is:

1. A valve seat material for an internal combustion engine consisting essentially of a Fe-Cr-C alloy matrix containing 0.5–30 weight percent, Cr and 0.1–3.0 weight percent carbon having dispersed therein (1) from about 0.3 to about 10 weight percent of a member selected from the group consisting of Pb and a Pb compound and from 1 to 10 weight percent of glass.

References Cited
UNITED STATES PATENTS

| 2,697,035 | 12/1954 | Clarke | 75—128 |
| 3,471,343 | 10/1969 | Koehler | 75—125 |
| 3,317,285 | 5/1967 | Alexander | 29—182.5 |
| 2,848,795 | 8/1958 | Lowey | 29—182.5 |
| 3,350,179 | 10/1967 | Stenerson | 29—182.5 |
| 2,408,430 | 10/1946 | Lowey | 29—182.5 |
| 3,019,103 | 1/1962 | Alexander | 29—182.5 |
| 3,269,833 | 3/1962 | Scruggs | 75—126 N |
| 3,024,110 | 3/1962 | Funkhouser | 29—182.5 |
| 3,282,658 | 11/1962 | Wainer | 75—126 R |

HYLAND BIZOT, Primary Examiner

U.S. Cl. X.R.
75—123R, 128 P